United States Patent [19]

Orlando

[11] 4,282,706
[45] Aug. 11, 1981

[54] SHAKER UNITS FOR HARVESTING MACHINES

[75] Inventor: Franklin P. Orlando, Morgan Hill, Calif.

[73] Assignee: FMC Corporation, San Jose, Calif.

[21] Appl. No.: 90,798

[22] Filed: Nov. 2, 1979

[30] Foreign Application Priority Data

Mar. 8, 1979 [GB] United Kingdom ............... 08161/79

[51] Int. Cl.³ ........................................... H01D 46/00
[52] U.S. Cl. ................................... 56/330; 56/328 R
[58] Field of Search ............ 56/330, 331, 328, 328 TS

[56] References Cited

U.S. PATENT DOCUMENTS

| | | | |
|---|---|---|---|
| 3,325,984 | 6/1967 | Christie et al. | 56/330 |
| 4,114,463 | 9/1978 | Garden et al. | 56/330 |
| 4,173,859 | 11/1979 | Goldsmith et al. | 56/330 |
| 4,179,873 | 12/1979 | Scudder | 56/330 |

Primary Examiner—Robert A. Hafer
Attorney, Agent, or Firm—L. J. Pizzanelli; R. B. Megley

[57] ABSTRACT

A harvesting machine for berries and fruits such as coffee beans and blackcurrants includes at least one tined shaker oscillating about a vertical or substantially vertical axis. The shaker is oscillated by out-of-balance weights and a shaft supporting the weights is not itself driven, the drive to the weights being effected through a sleeve surrounding the shaft and toothed belts.

4 Claims, 4 Drawing Figures

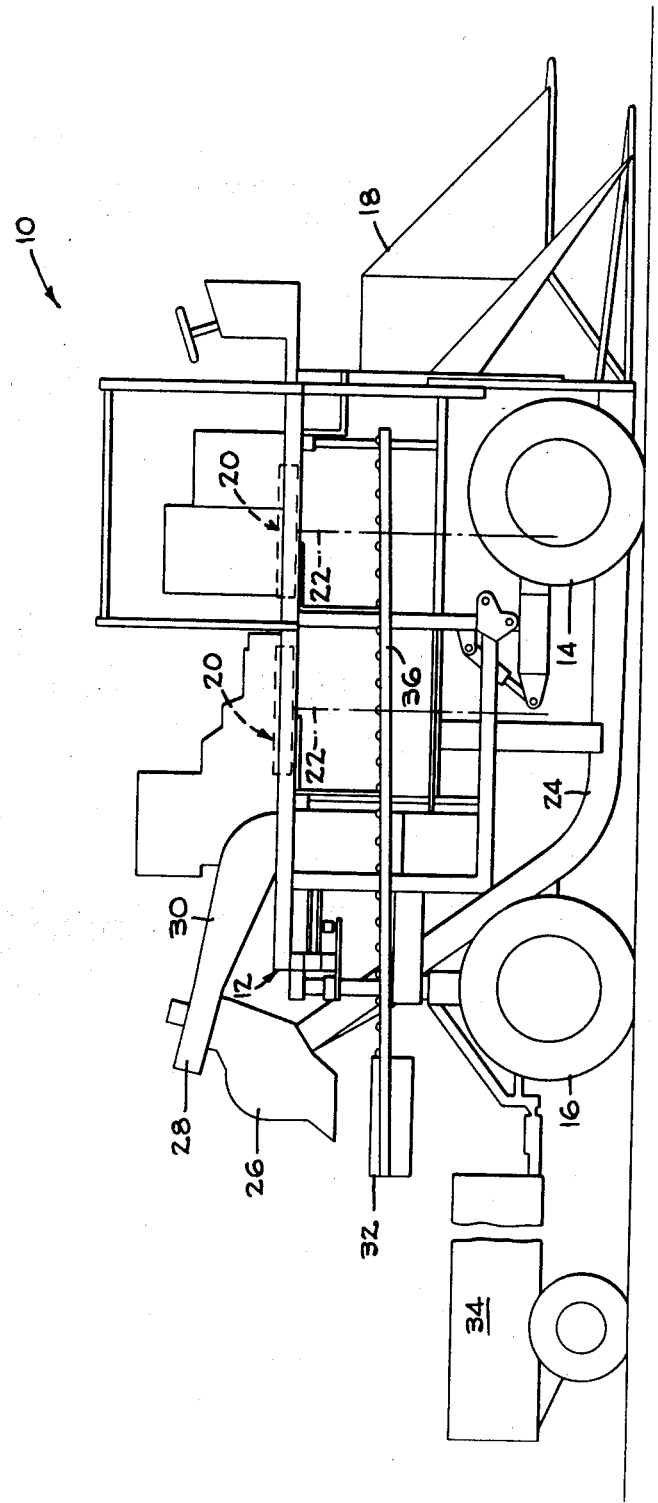

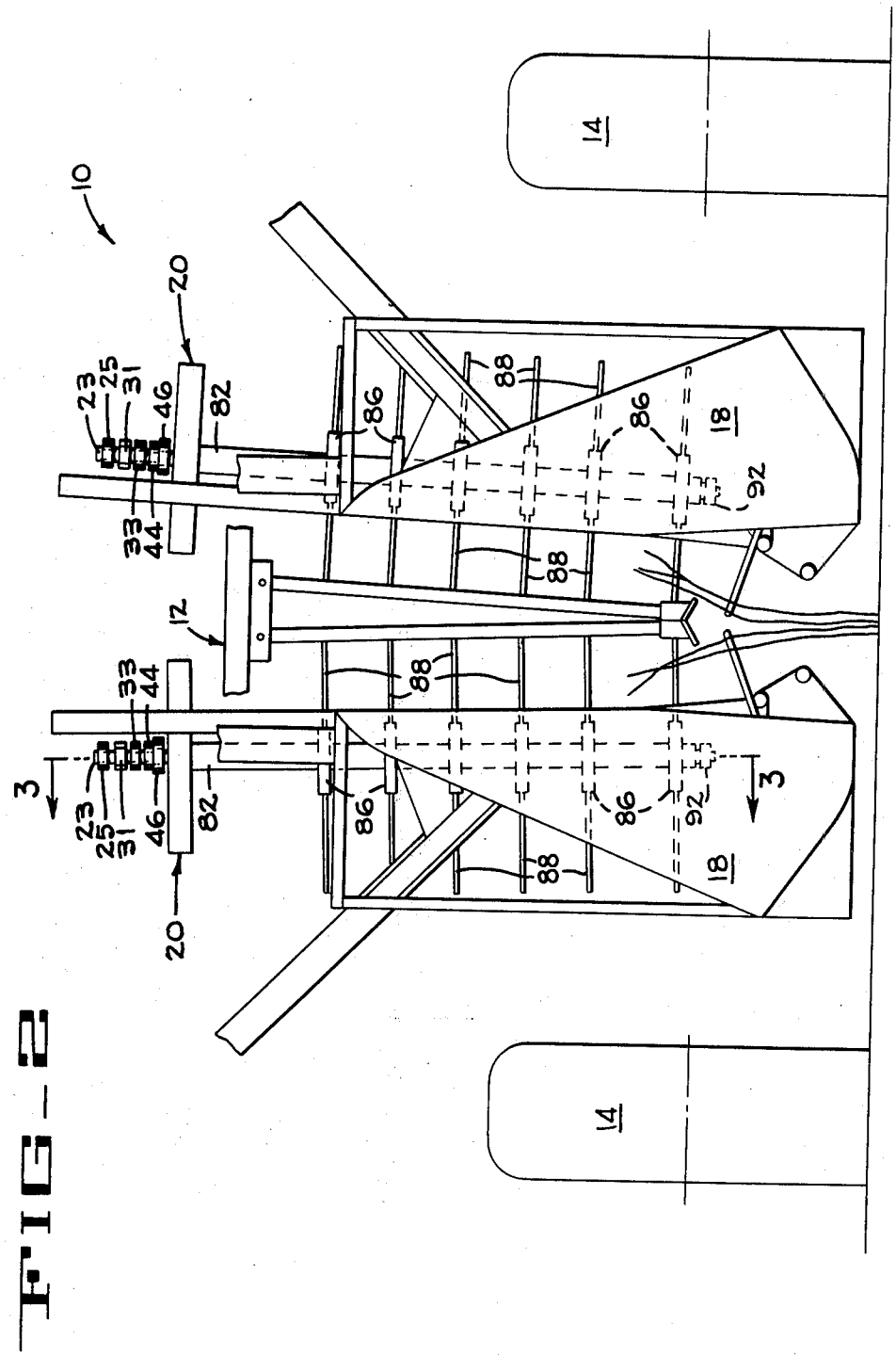

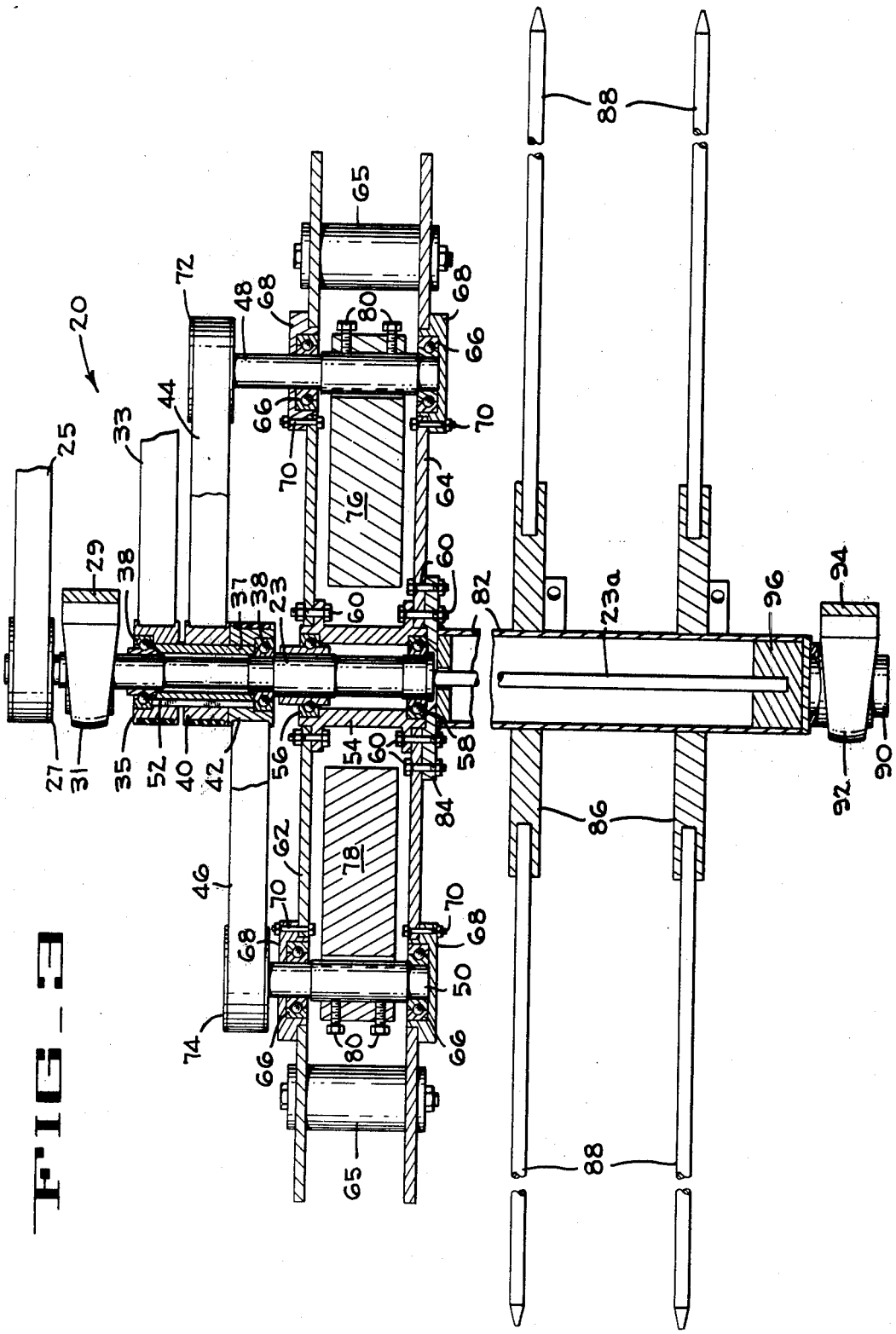

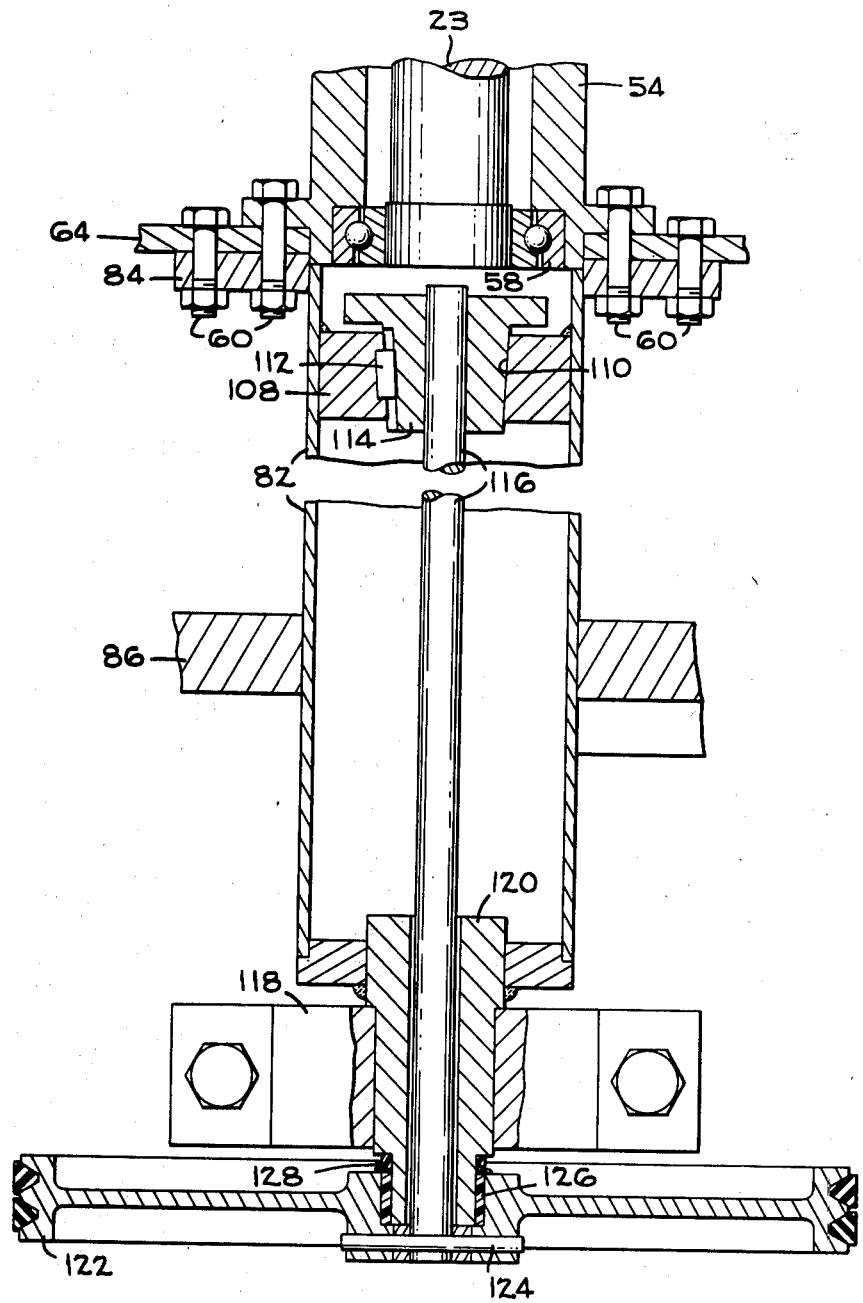
FIG_4

1

SHAKER UNITS FOR HARVESTING MACHINES

FIELD OF THE INVENTION

This invention relates to shaker units for harvesting machines intended for gathering useful crops from bushlike plants, such as blackcurrants, raspberries and coffee beans. The invention also relates to the combination of an agricultural tractor and one or more shaker units.

SUMMARY OF THE INVENTION

It has been already been proposed to provide a machine incorporating several oscillatory shaker units which engage with tines, plants carrying fruit, and detach that fruit from the plant by shaking action. In this previous proposal the shaker units are rotated by interaction between the tines and the bushes as the machine is moved linearly along a row of bushes. The oscillations are positively applied to the rotary shaker units by an oscillating weight system, with weights disposed diametrically opposite one another about a central shaft to the shaker units, a wind-milling effect is liable to occur causing the shaker units to rotate in an uncontrolled manner which can damage the useful crops, and or the bushes. This wind-milling effect is, of course, caused by the inevitable friction in the bearings supporting the central shaft. The wind-milling effect can be eliminated by a friction band applied to the central shaft but this increases the resistance to rotation and hence possible damage to the bushes.

It has already been proposed to drive such shaker units both in a rotational sense and also to impose an oscillatory motion. One previous proposal requires, however, a complex gearing system in order to achieve this desired result, and the complexity leads both to initial high expense and the possibility of poor reliability resulting directly from the complexity and the use under field conditions.

According to the present invention there is provided a shaker unit for incorporation in a harvesting machine comprising an oscillatory tine assembly for engaging bushes to be harvested, out of balance weight means coupled to the tine assembly for oscillating the assembly, a support shaft for supporting the tine assembly and the out of balance weight means, drive means for driving the out of balance weight means and further drive means for positively rotating the tine assembly, the drive means incorporating an element which can accommodate the oscillatory movement whilst simultaneously transmitting the rotational drive.

Further according to the present invention, there is provided a shaker unit for incorporation in a harvesting machine comprising an oscillatory tine assembly for engaging bushes to be harvested, means supporting the tine assembly for rotation and oscillatory motion, means for driving the tine assembly at a rotary speed "matched" to the linear speed of the machine and means for imparting oscillatory motion to the tine assembly, said drive means being capable of accommodating in a torsional manner the oscillatory motion whilst positively driving the tine assembly in a rotary sense.

BRIEF DESCRIPTION OF THE DRAWINGS

A shaker unit embodying the invention for incorporation in a harvesting machine (or a conventional tractor) will now be described, by way of example, with reference to the accompanying diagrammatic drawings, in which:

FIG. 1 is a side elevation of the harvester incorporating the novel shaker unit of the present invention.

FIG. 2 is a front elevation of the harvester of FIG. 1.

FIG. 3 is an enlarged section, taken substantially along the line 3—3 of FIG. 2, of the shaker unit with portions being broken away and FIG. 4 is a fragmentary section of a modified form of a portion of the shaker unit.

DESCRIPTION OF THE PREFERRED EMBODIMENT

The disclosed harvesting machine incorporating the rotational drive constructed in accordance with FIG. 3 is disclosed and claimed in application Ser. No. 90,815, filed Nov. 2, 1979, still pending, which is assigned to the assignee of the present invention.

With reference to FIG. 1, illustrating the harvesting machine incorporating the novel shaker units of the present invention, the harvester is generally indicated by numeral 10 and it will be seen to include a frame structure 12 mounting pairs of forward and rearward wheels 14 and 16 respectively. At the forward end of the harvester cooperating forwardly projecting vine spreading plows 18 are rigidly mounted and they serve to divide and direct the bushes to the shaker units 20. Their location is generally indicated by phantom line 22 in FIG. 1. Directly below the shaker units, chain conveyors 24, carrying pans formed with cleats, are provided and in operation they transport the removed crop and any leaves or vine fragments rearwardly and upwardly to a casing 26 connected to the inlet of a fan 28 which serves to separate extraneous material such as leaves and vine fragments from the harvested crop. The leaves and vine fragments are discharged, by means of a duct 30, to the ground whereas the cleaned crop cascades downwardly and is collected in a container 32. A wagon 34 hitched to the frame of the harvester stores filled containers 32 which are manually located at the illustrated filling position than to the wagon when filled. A conventional roller conveyor 36, slightly inclined to the rear, serves to store empty containers that are successively positioned at the loading station.

In accordance with the novel subject matter of the present invention the shaker unit 20, which is shown in detail in FIGS. 3 and 4 incorporates dual drive inputs that effect controlled angular oscillation of the vine shaking tines and concurrent rotation of the tine assembly at a speed which is synchronized with a speed at which the harvesting unit is travelling. Synchronization of the drive is brought about by a comparator unit which per se does not form part of this application, but is described and claimed in U.S. Pat. No. 4,176,511, which is assigned to the assignee of the present application. By reference thereto it is intended that this disclosure be incorporated herein. The comparator unit provides an input to a hydraulic motor (not shown) that drives a shaft 23 by means of a timing belt 25 and a pulley 27. A support plate 29, connected to the frame 12, supports a pillow block bearing 31 rotatably supporting the shaft 23.

While this application will substantially duplicate the description of the construction and mode of operation of the subject matter of FIG. 3, which is disclosed and claimed in the above mentioned U.S. application, it is to be understood that it is applicant's intention to restrict the claims appended hereto, to the embodiment of FIG. 4.

The input for operating the oscillatory drive is derived from another hydraulic motor (not shown) driving a timing belt 33 connected to a pulley 35. A short tubular shaft 37, concentric with the shaft 23, is mounted for rotation relative to the shaft 23 by bearings 38. The input provided by the belt 33 to the pulley 35 is imparted to stacked pulleys 40 and 42 driving, by means of timing belts 44 and 46, respectively, short stub shafts 48 and 50. The three axially spaced pulleys 35, 40 and 42 are secured for rotation with the tubular shaft 37 by a longitudinal key 52.

A tubular hub 54 is connected to the lower end of the shaft 23 by means of axially spaced bearings 56 and 58. The hub is formed with flanges to which are rigidly secured, by means of screw fasteners collectively identified by the numeral 60, to axially spaced plates 62 and 64. Outboard spacers 65 interconnect the plates 62 and 64. As will be evident by inspection of FIG. 3, the stub shafts 48 and 50 are rotatably mounted to the plates 62 and 64 by means of bearings 66 confined within cup-shaped housings 68 secured to the respective plates by screw fasteners 70. Keyed to the upper end of each shaft 48 and 50 are pulleys 72 and 74, respectively, which are driven by timing belts 44 and 46.

A dynamic imbalanced condition is created in the shaker unit 20 by keying weights 76 and 78 to the shafts 48 and 50, respectively, and retaining the weights rigid with the shafts by set screws 80. As will be apparent, dynamic imbalance is created by locating the center of gravity of the weights 76 and 78 away from the axis of rotation of the shafts 48 and 50.

A tubular shaft 82, preferably having a generally rectangular cross-sectional shape, is rigidly secured to the lower plate 64 by being welded to a bored disc 84 which in turn is fastened to the plate 64 by the screw fasteners 60. The tubular shaft 82 has fixed thereon split hubs 86 carrying a plurality of radially extending circumferentially spaced tines 88 that penetrate the bushes or plants and transmit the shaking motion generated by the weights 76 and 78 to the tines 88. As a result, mature fruit is dislodged and is collected on the conveyors 24.

On the lower end of the shaft 82, a short shaft extension 90 is rigidly secured and is carried within a pillow block bearing 92 which in turn is secured to the frame of the harvester through a support 94. Rotary motion imparted to the shaft 23 by the hydraulic drive, driving the timing belt 25 is transmitted to the shaft 82 by a small diameter extension 23a having its lower end secured to a block 96 located within the square tubular shaft 82. The shaft extension 23a has its diameter selected so that it will torsionally deflect in response to the shaking motion imparted by the weights 76 and 78 as they rotate. In addition, the shaft extension 23a imparts the control rotation to the tubular shaft 82 and, of course, by virtue of its rigid connection to the disc 84, to the plates 62 and 64.

With reference to FIG. 4 which illustrates the subject matter of the present invention, it will be seen that the construction of the center shaft, the shaker unit and the tine assembly may be the same as in the above described construction, or may be the same as the corresponding construction described in copending British appln. No. 20335/76 in the name of Pattenden Engineering Limited. Like parts have been given the same reference numerals as those of the embodiment hereinbefore described.

As is apparent from FIG. 4, the lower, square-section, tube 82 carries internally a square section support member 108 which is welded to the tube and has a central, tapered, aperture 110 with a keyway for a key 112. The key 112 engages a corresponding keyway of a taper-lock bushing 114.

The bushing 114 itself has a central bore or other aperture by which the bushing is keyed to one end of an elongate torsion bar 116 extending over the whole length of the tube 82. The lower end of the tube 82 is supported in a bearing 118 through the intermediary of a stepped sleeve 120. A lower end portion of the bar 116 passes through the sleeve 120 and is secured for rotation with a drive pulley 122 through a shear pin 124. The pulley is mounted for rotation on the lowermost portion of the sleeve by a plastic bearing bushing 126 made for example of Delrin AF 113 or other appropriate material. A dirt seal 128 is provided at the upper end of this bearing bushing.

The pulley 122 may be, as shown, a V-belt, but can also be toothed as the pulleys 27, 35 and 40.

The rotational drive to the torsion bar 116 is provided by the pulley 122 from a hydraulic motor (not shown) while the superimposed oscillatory motion is applied to the bar from the shaker units through the square-section tube 82 and the taper-lock bushing 114. By appropriate dimensioning of the torsion bar, for example $\frac{5}{8}''$ diameter and a minimum length of 4' and appropriate material, such as cold rolled steel, the torsion bar 116 will be able to accommodate both the rotational and oscillatory motions without risk of overloading. In the event that the tine assembly strikes a rigid obstacle, the shear pin 124 will rupture thereby interrupting the rotary drive. The oscillating assembly with the torsion bar will not be operated at its natural frequency.

The shaker units hereinbefore described may be mounted on a straddle harvester in pairs about the longitudinal center line of the harvester, so that the shakers engage with opposite sides of the bush to be harvested.

It is also possible (as proposed in copending British application No. 43758/78 in the name of Pattenden Engineering Limited) where small farms or holdings are involved to mount one of the shaker units on a frame provided on a conventional agricultural tractor. This arrangement avoids the need for a purpose-built machine which will often be too costly for a small farm to support.

In some circumstances the tractor may be arranged to carry two shaker units mounted one on each side of the tractor.

Although the best mode contemplated for carrying out the present invention has been herein shown and described, the subject matter which is regarded as the invention is set forth in the appended claims.

What I claim is:

1. A shaker assembly for use in a harvesting machine, said assembly comprising shaker shaft means, circumferentially spaced tines projecting radially from said shaker shaft means, means for circumferentially oscillating said shaker shaft means and tines about the axis of said shaft means, means for unidirectionally rotating said shaker shaft means about its axis including a driven rotary member and means for driving said rotary member; the improvement comprising rotationally elastic, elongate torsion bar means concentric with the axis of said shaker shaft means, means for connecting one end portion of said torsion bar means to said driven rotary member, and means for connecting the other end portion of said torsion bar means to said shaker shaft means.

2. The shaker assembly of claim 1, wherein said shaker shaft means comprises a tube, said torsion bar means comprising a rod extending from said driven rotary member into said tube to the connecting means of said shaker shaft.

3. A shaker unit for use in a harvesting machine, said shaker unit including a shaft supporting radially projecting circumferentially spaced tine assemblies being axially spaced along said shaft, drive means for concurrently oscillating and rotating said shaft about its axis, the improvement in said drive imparting rotation to said shaft comprising means for imparting oscillatory motion to one end of said shaft, means for imparting rotary motion to the other end of said shaft, and a torsion bar directly connected to said rotary motion imparting means for elastically attenuating the oscillatory and the rotational motions, said torsion bar is secured to a pulley by a shear pin.

4. A shaker unit for use in a harvesting machine, said shaker unit including a shaft supporting radially projecting circumferentially spaced tine assemblies being axially spaced along said shaft, drive means for concurrently oscillating and rotating said shaft about its axis, the improvement in said drive imparting rotation of said shaft comprising means for imparting oscillatory motion to one end of said shaft, means for imparting rotary motion to the other end of said shaft, and a torsion bar directly connected to said rotary motion imparting means for elastically attenuating the oscillatory and the rotational motions, said shaft comprises one hollow section supporting out of balance weights that effect oscillatory motion and another hollow section mounting tine assemblies, said torsion bar being located in said another hollow section and drivingly connected thereto by a tapered bushing.

* * * * *